US011846193B2

(12) United States Patent
Kulinski et al.

(10) Patent No.: US 11,846,193 B2
(45) Date of Patent: Dec. 19, 2023

(54) TURBINE ENGINE ASSEMBLY

(71) Applicant: General Electric Company Polska sp. z o.o., Warsaw (PL)

(72) Inventors: Piotr Jerzy Kulinski, Warsaw (PL); Tomasz Edward Berdowski, Warsaw (PL)

(73) Assignee: General Electric Company Polska Sp. z o.o., Warsaw (PL)

( * ) Notice: Subject to any disclaimer, the term of this patent is extended or adjusted under 35 U.S.C. 154(b) by 0 days.

(21) Appl. No.: 16/939,435

(22) Filed: Jul. 27, 2020

(65) Prior Publication Data

US 2021/0087942 A1  Mar. 25, 2021

(30) Foreign Application Priority Data

Sep. 17, 2019  (PL) .......................................... 431184

(51) Int. Cl.
*F01D 11/04* (2006.01)

(52) U.S. Cl.
CPC .......... *F01D 11/04* (2013.01); *F05D 2220/32* (2013.01); *F05D 2240/55* (2013.01)

(58) Field of Classification Search
CPC ... F01D 9/04; F01D 9/02; F01D 11/04; F05D 2220/32; F05D 2240/55
See application file for complete search history.

(56) References Cited

U.S. PATENT DOCUMENTS

| | | | | |
|---|---|---|---|---|
| 4,076,451 A * | 2/1978 | Jankot | .................... | F01D 5/284 |
| | | | | 415/209.2 |
| 4,889,470 A | 12/1989 | Scalzo | | |
| 6,164,903 A * | 12/2000 | Kouris | ..................... | F01D 9/04 |
| | | | | 415/138 |
| 8,105,019 B2 | 1/2012 | McCaffrey et al. | | |
| 8,202,043 B2 | 6/2012 | McCaffrey | | |
| 8,434,224 B2 | 5/2013 | Berlanger et al. | | |
| 8,464,425 B2 | 6/2013 | Berlanger et al. | | |
| 9,810,082 B2 | 11/2017 | Calza | | |
| 9,951,692 B2 | 4/2018 | Aronsson et al. | | |
| 2002/0090294 A1* | 7/2002 | Keith | ........................ | F01D 9/04 |
| | | | | 415/115 |
| 2002/0127097 A1* | 9/2002 | Darolia | ................. | F01D 5/3084 |
| | | | | 415/137 |
| 2004/0067131 A1* | 4/2004 | Joslin | .................... | F04D 29/542 |
| | | | | 415/191 |
| 2005/0035559 A1* | 2/2005 | Rogers | .................. | F01D 11/001 |
| | | | | 310/216.032 |
| 2006/0222487 A1* | 10/2006 | Au | ........................ | F04D 29/083 |
| | | | | 415/174.4 |

(Continued)

FOREIGN PATENT DOCUMENTS

CA  2924169 A1  10/2016
EP  0501700 A1  9/1992

(Continued)

*Primary Examiner* — David E Sosnowski
*Assistant Examiner* — Theodore C Ribadeneyra
(74) *Attorney, Agent, or Firm* — McGarry Bair PC

(57) ABSTRACT

An assembly for a turbine engine can include a monolithic body with an inner band and an outer band radially spaced from the inner band, a pocket surface in one of the inner or outer bands defining a recess, and an airfoil with a first end radially extending from the other of the inner or outer bands.

22 Claims, 8 Drawing Sheets

(56) References Cited

U.S. PATENT DOCUMENTS

| | | | |
|---|---|---|---|
| 2007/0231150 A1* | 10/2007 | Dervaux | F01D 11/005 416/224 |
| 2010/0054932 A1* | 3/2010 | Schiavo | F01D 9/04 415/200 |
| 2010/0080695 A1* | 4/2010 | Briggs | F01D 9/04 415/191 |
| 2011/0107769 A1* | 5/2011 | Stevenson | F23R 3/14 60/737 |
| 2011/0171018 A1 | 7/2011 | Garcia-Cresp | |
| 2011/0243752 A1* | 10/2011 | Duchaine | B29C 70/865 156/189 |
| 2012/0274034 A1* | 11/2012 | Bouchard | F16J 15/065 277/650 |
| 2013/0051980 A1* | 2/2013 | Grohens | F01D 17/085 415/115 |
| 2013/0121833 A1* | 5/2013 | Lucashu | F01D 9/04 416/204 R |
| 2013/0202427 A1* | 8/2013 | Macelroy | F01D 9/041 228/119 |
| 2014/0001285 A1* | 1/2014 | Grooms, III | F01D 5/18 239/265.11 |
| 2014/0013772 A1* | 1/2014 | Hayford | F01D 9/044 415/208.1 |
| 2014/0140832 A1* | 5/2014 | Hasting | F01D 9/042 415/190 |
| 2014/0202133 A1* | 7/2014 | Praisner | F01D 9/04 60/791 |
| 2014/0212284 A1 | 7/2014 | Jamison et al. | |
| 2014/0301841 A1* | 10/2014 | Azalbert | F04D 29/542 415/209.4 |
| 2014/0373556 A1* | 12/2014 | Aronsson | F01D 9/044 29/888 |
| 2015/0098812 A1* | 4/2015 | Paradis | F01D 9/042 415/209.3 |
| 2015/0226073 A1* | 8/2015 | Batt | F01D 5/18 415/177 |
| 2015/0308277 A1* | 10/2015 | Verheist | F01D 9/04 415/200 |
| 2015/0322563 A1* | 11/2015 | Snyder | F01D 9/04 118/504 |
| 2015/0337673 A1* | 11/2015 | McCaffrey | B23P 19/00 29/889.22 |
| 2015/0354380 A1* | 12/2015 | Roberts | F01D 9/04 415/177 |
| 2015/0361804 A1* | 12/2015 | Hubbert | F01D 5/02 29/889.21 |
| 2015/0369079 A1* | 12/2015 | McCaffrey | F02C 9/22 415/148 |
| 2016/0003070 A1* | 1/2016 | Kastel | F01D 9/041 415/209.3 |
| 2016/0032743 A1* | 2/2016 | Duchaine | B29C 65/48 156/60 |
| 2016/0040553 A1* | 2/2016 | Headland | F01D 9/04 415/126 |
| 2016/0069216 A1* | 3/2016 | Henkel | F02C 3/04 415/200 |
| 2016/0090147 A1 | 3/2016 | Awasa | |
| 2016/0115800 A1* | 4/2016 | Lyders | F01D 25/28 415/208.1 |
| 2016/0123166 A1* | 5/2016 | Ols | F01D 9/041 415/210.1 |
| 2016/0169033 A1* | 6/2016 | Weaver | F01D 9/02 415/200 |
| 2016/0215653 A1* | 7/2016 | DaCunha | F01D 5/06 |
| 2016/0222807 A1 | 8/2016 | Liebl et al. | |
| 2016/0258305 A1* | 9/2016 | Wilber | F02C 7/20 |
| 2017/0107821 A1 | 4/2017 | Schwarz | |
| 2017/0138264 A1* | 5/2017 | Tham | F01D 25/30 |
| 2017/0292403 A1* | 10/2017 | Schlemmer | F01D 25/06 |
| 2017/0328237 A1* | 11/2017 | Bencini | F01D 9/04 |
| 2018/0216493 A1* | 8/2018 | Moniz | F01D 9/065 |
| 2018/0266277 A1 | 9/2018 | Aschenbruck et al. | |
| 2019/0010815 A1* | 1/2019 | Watanabe | F01D 9/02 |
| 2019/0022927 A1 | 1/2019 | Vial et al. | |
| 2019/0085698 A1 | 3/2019 | van der Merwe et al. | |
| 2020/0040753 A1* | 2/2020 | Jones | F01D 11/006 |
| 2020/0080434 A1* | 3/2020 | Thomas | F01D 5/282 |

FOREIGN PATENT DOCUMENTS

| | | |
|---|---|---|
| EP | 1564382 A2 | 8/2005 |
| EP | 2105581 A2 | 9/2009 |
| EP | 2832975 A1 | 2/2015 |
| GB | 943023 | 11/1963 |
| GB | 1387866 A | 3/1975 |
| GB | 2250782 A | 6/1992 |
| JP | S60209604 A | 10/1985 |
| WO | 2004074640 A1 | 9/2004 |

* cited by examiner

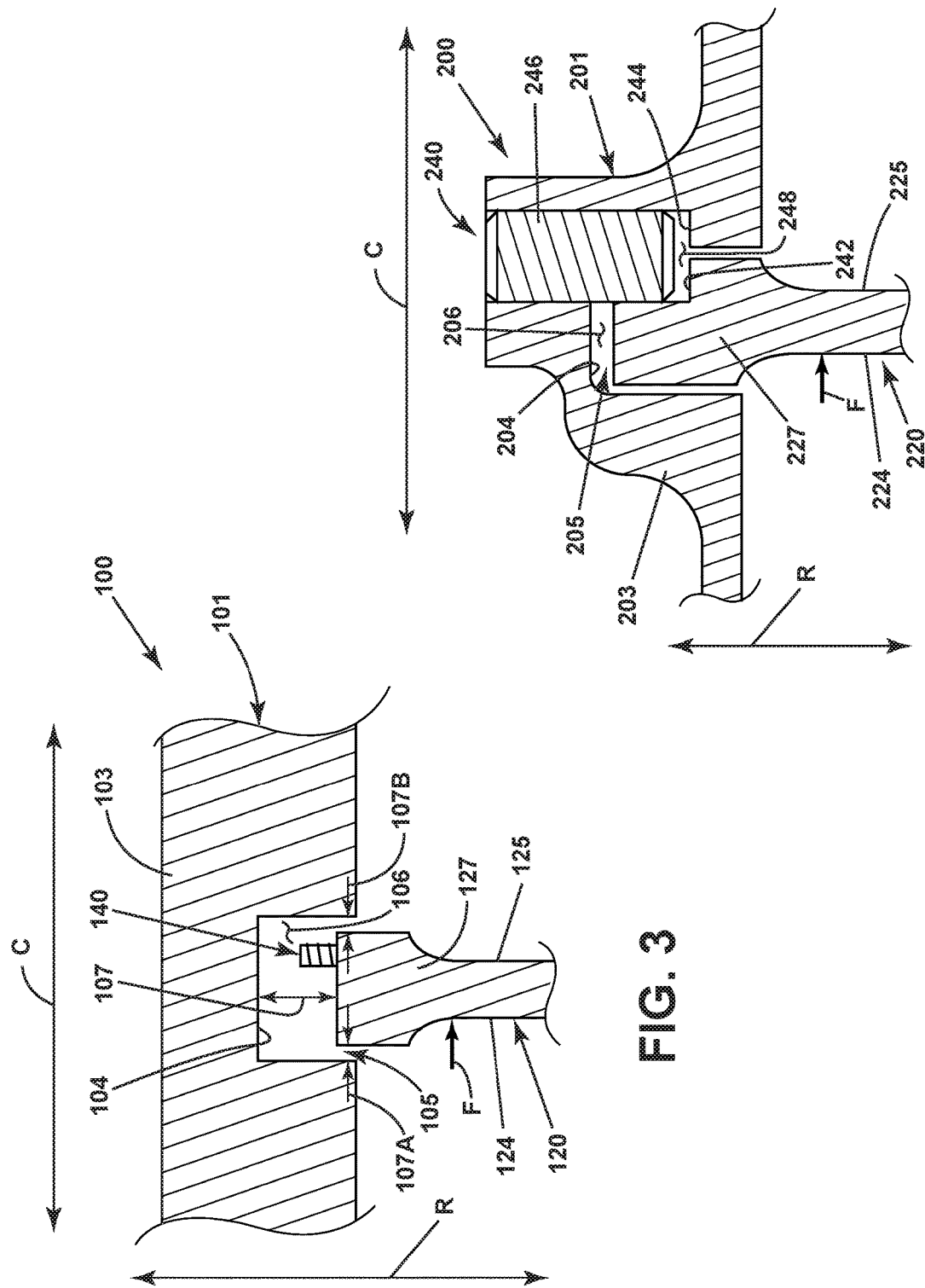

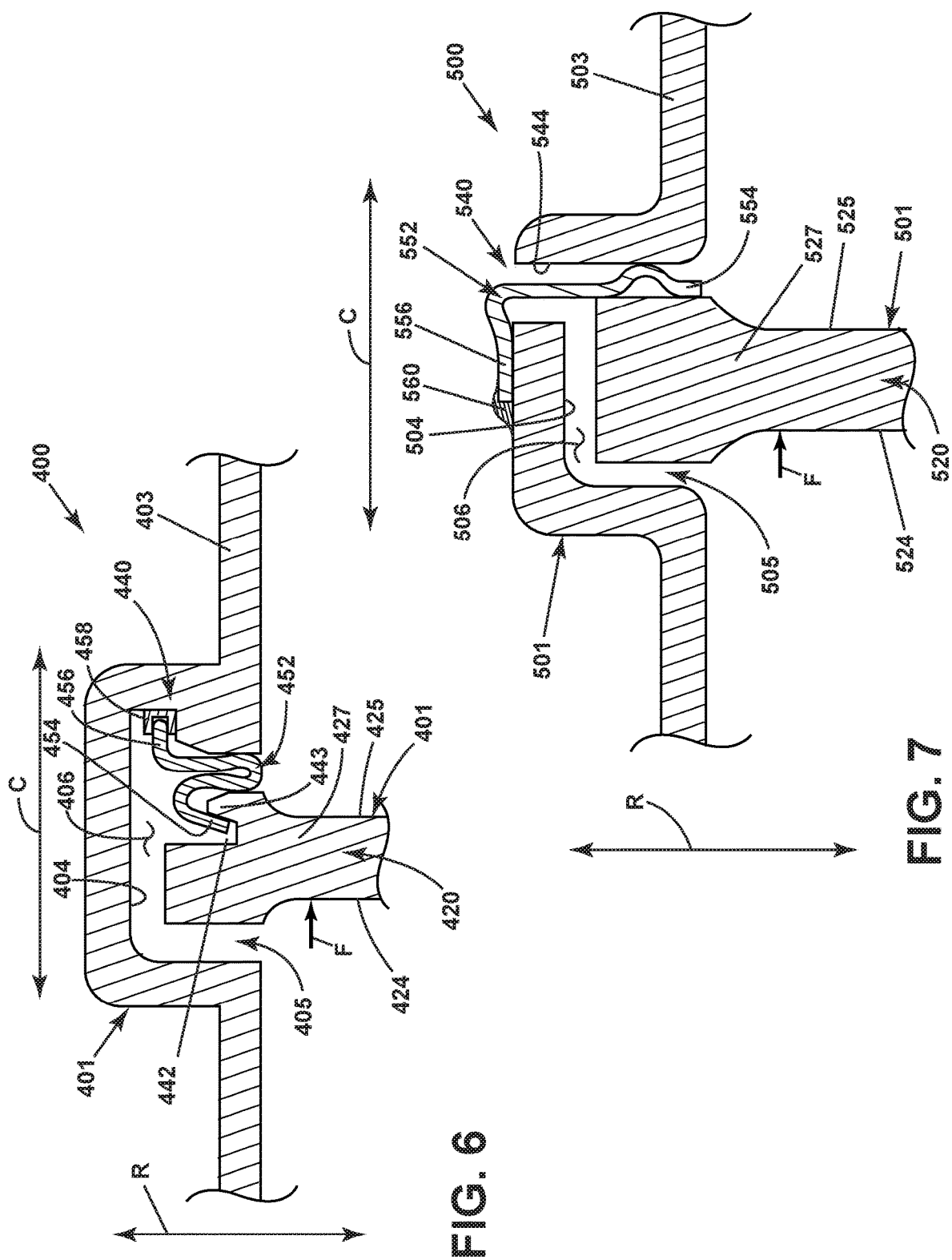

TURBINE ENGINE ASSEMBLY

CROSS-REFERENCE TO RELATED APPLICATION(S)

This application claims priority to Polish Application No. P. 431184, filed Sep. 17, 2019, which is incorporated herein by reference in its entirety.

TECHNICAL FIELD

This disclosure generally relates to airfoils, including static vanes or rotating blades, within turbine engines, and more particularly to a turbine engine assembly including such airfoils.

BACKGROUND

Turbine engines, and particularly gas or combustion turbine engines, are rotary engines that extract energy from a flow of pressurized combusted gases passing through the engine onto rotating turbine blades.

Gas turbine engines utilize a mainstream flow to drive the rotating turbine blades to generate thrust. The mainstream flow is propelled by combustion of gas to increase the thrust generated by the engine. Sealing members or other structures can be utilized for directing airflows to desired locations within the engine, as well as providing for controlled movement of turbine engine components during operation.

BRIEF DESCRIPTION

In one aspect, the disclosure relates to an assembly for a turbine engine. The assembly includes a monolithic body having an inner band and an outer band radially spaced from the inner band, a pocket surface in one of the inner or outer bands defining a recess, and an airfoil comprising an outer wall defining a pressure side and a suction side, a first end radially extending from the other of the inner or outer bands, and a second end radially extending into the recess to define a gap between the airfoil and the one of the inner or outer bands.

In another aspect, the disclosure relates to a turbine engine. The turbine engine includes a compressor, a combustor, and a turbine in axial arrangement, and an assembly in at least one of the compressor or the turbine. The assembly includes a monolithic body having an inner band and an outer band radially spaced from the inner band, a pocket surface in one of the inner or outer bands defining a recess, and an airfoil comprising an outer wall defining a pressure side and a suction side, a first end radially extending from the other of the inner or outer bands, and a second end radially extending into the recess to define a gap between the airfoil and the one of the inner or outer bands.

In yet another aspect, the disclosure relates to an assembly for a turbine engine. The assembly includes a monolithic body having an inner band, an outer band radially spaced from the inner band, a recess in one of the inner or outer bands, and a second vane having a root at the other of the inner or outer bands and a second tip located within the recess and free of the one of the inner or outer bands.

BRIEF DESCRIPTION OF THE DRAWINGS

In the drawings:

FIG. 3 is a side sectional view of a portion of the assembly of FIG. 2.

FIG. 4 is a side sectional view of another assembly that can be utilized in the turbine engine of FIG. 1 having a support structure in accordance with various aspects described herein.

FIG. 6 is a side sectional view of another assembly that can be utilized in the turbine engine of FIG. 1 having another support structure in accordance with various aspects described herein.

FIG. 7 is a side sectional view of another assembly that can be utilized in the turbine engine of FIG. 1 having another support structure in accordance with various aspects described herein.

DESCRIPTION OF EMBODIMENTS

Figure 1:
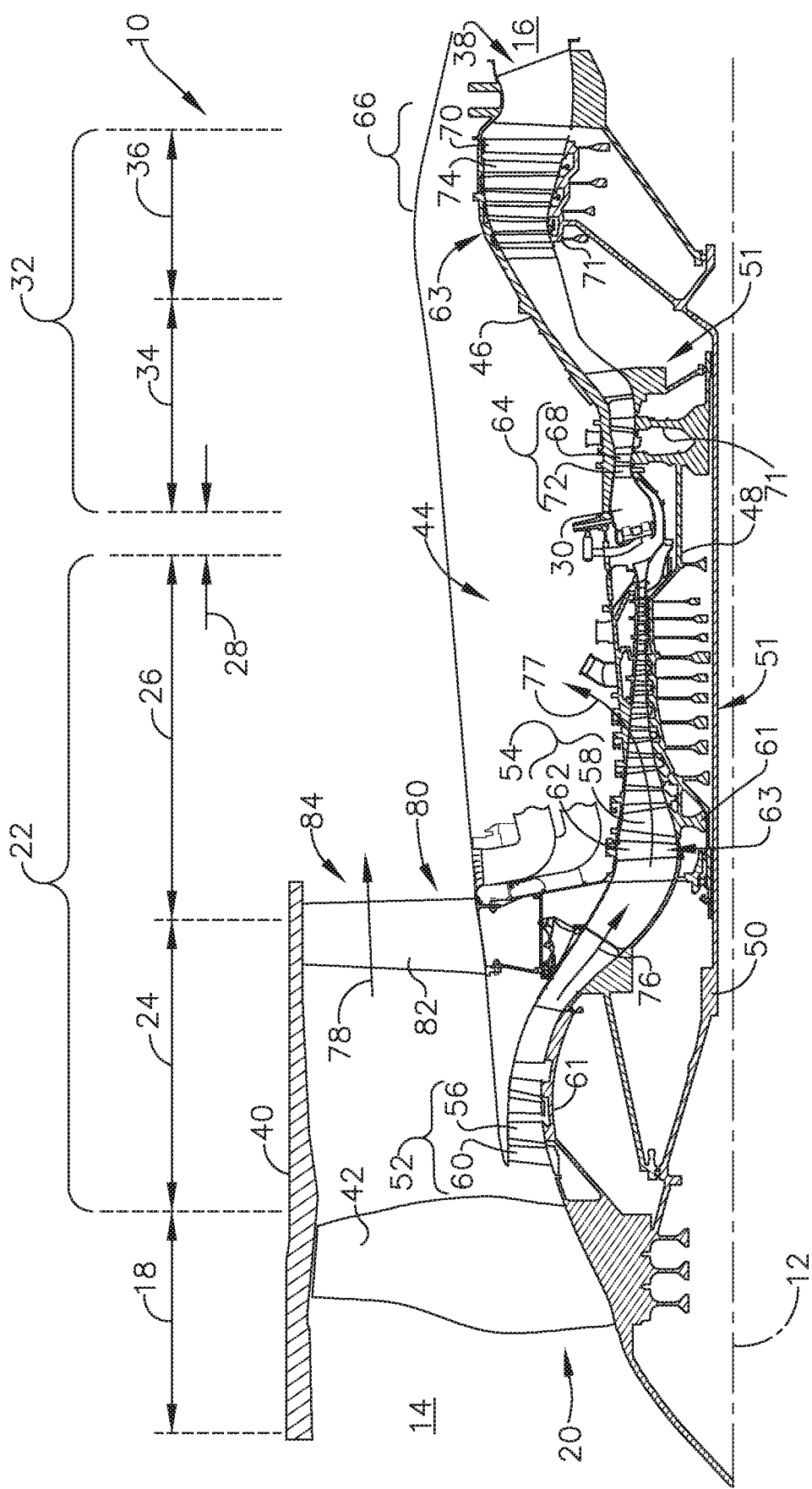
FIG. 1 is a schematic cross-sectional diagram of a turbine engine for an aircraft.

The described embodiments of the present disclosure are directed to an assembly for a turbine engine. For purposes of illustration, the present disclosure will be described with respect to an airfoil assembly for an aircraft turbine engine. It will be understood, however, that the disclosure is not so limited and may have general applicability within any engine, as well as in non-aircraft applications, such as other mobile applications and non-mobile industrial, commercial, and residential applications.

Airfoil assemblies within turbine engines can undergo internal stresses in operation due to a variety of sources, including air pressure differences surrounding each airfoil, thermal expansion of the airfoil or bands, or vibrational forces on the airfoil. Such stresses can occur anywhere along the airfoil, including at attachment points or couplings between the airfoil and a platform, band, or disk. In an example where stationary vanes are coupled at each end between inner and outer bands, such internal stresses can cause component wear such as fatigue, creep, or cracking of the airfoil over time.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
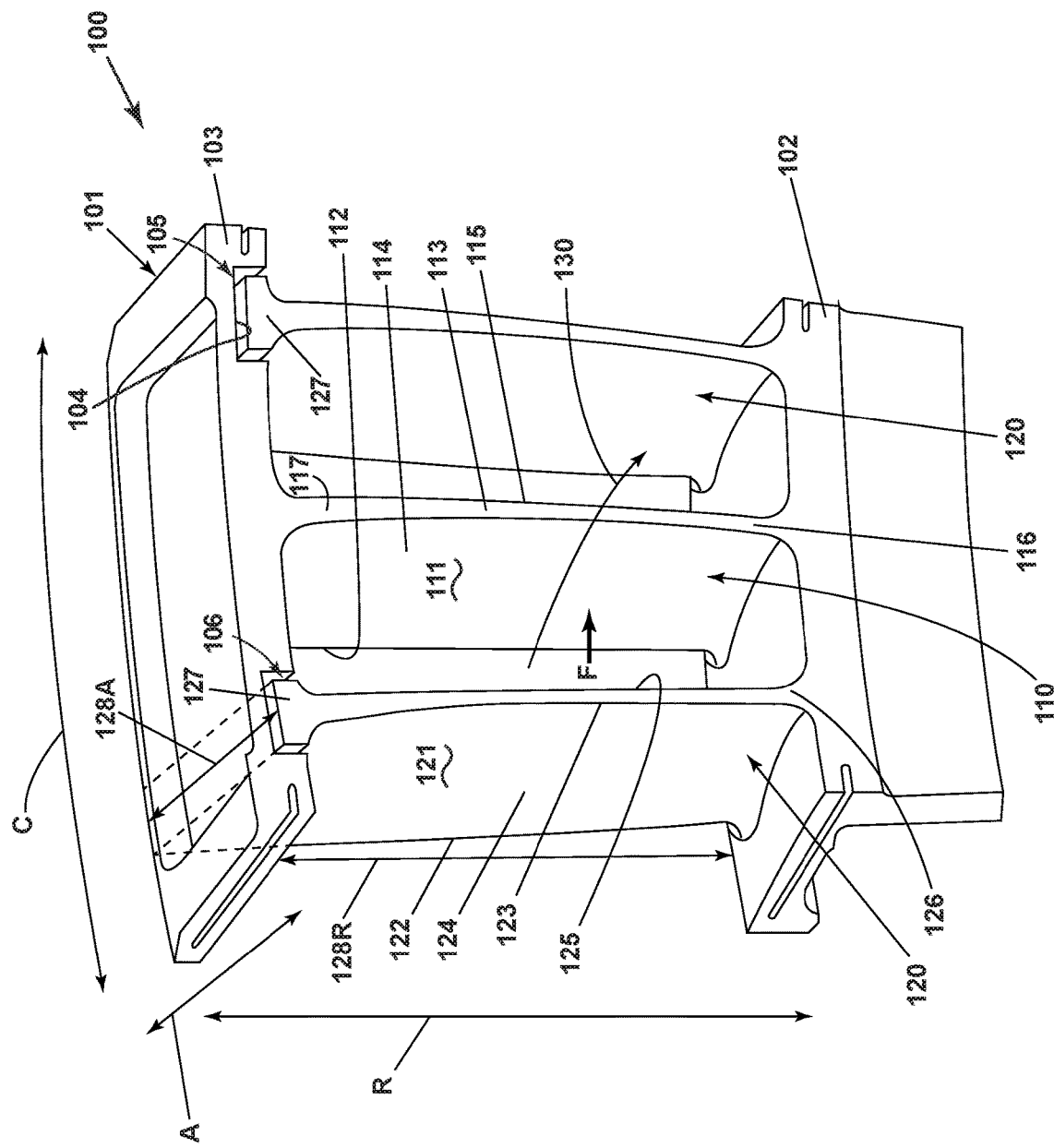
FIG. 2 is a perspective view of an assembly for the turbine engine of FIG. 1 in accordance with various aspects described herein.

Referring now to FIG. 2, an assembly 100 is illustrated that can be utilized in the turbine engine 10 of FIG. 1. The assembly 100 is shown in the form of an airfoil assembly. For example, the assembly 100 can include the HP turbine vanes 72 (FIG. 1). It will be understood that aspects of the disclosure can also have applicability to rotating blades or static vanes, and that the assembly 100 can be located at any suitable location within the turbine engine 10 including, but not limited to, the compressor section 22 or turbine section 32.

The assembly 100 can include a body 101. It is contemplated that the body 101 of the assembly 100 can include multiple separate components e.g. rotating blades, static vanes, platforms, inner or outer bands, or the like assembled together, such as with attachment hardware or other joining methods. In the example of FIG. 2, the body 101 is in the form of a monolithic body 101. As used herein, "monolithic body" will refer to a body formed as a single, unitary piece. Such a monolithic body can include multiple components or elements, and it will be understood that such components or elements are also formed with the monolithic body without need of further attachment via hardware, adhesives, or the like. For example, a body formed by multiple separate elements secured together (e.g. adhesives, bolts, or the like), does not form a monolithic body.

The monolithic body 101 includes an inner band 102 and an outer band 103 radially spaced from the inner band 102. The inner and outer bands 102, 103 can at least partially define a circumferential direction C, a radial direction R, and an axial direction A as shown. The axial direction A can be aligned with the engine centerline 12 (FIG. 1).

A pocket surface 104 defining a recess 105 can be included in either or both of the inner band 102 or outer band 103. In the example shown, the pocket surface 104 and recess 105 are located in the outer band 103. As used herein, "pocket surface" will refer to a portion of a wall that curves or bends to define a recess within that wall.

The monolithic body 101 can also include a vane 110 extending fully between the inner and outer bands 102, 103. The vane 110 includes a vane outer wall 111 with a vane leading edge 112 and a vane trailing edge 113 and defining a vane pressure side 114 and a vane suction side 115. The vane outer wall 111 can also define radially-spaced first and second ends that are illustrated as a vane root 116 at the inner band 102 and a vane tip 117 at the outer band 103, respectively.

The monolithic body 101 can further include an airfoil 120 having an outer wall 121 with a leading edge 122 and trailing edge 123 and defining a pressure side 124 and a suction side 125. The outer wall 121 can also define radially-spaced first and second ends that are illustrated as a root 126 and a tip 127, respectively.

In the example shown, the airfoil 120 is in the form of a static vane. It will be understood that aspects of the disclosure can also be applied to a rotating blade extending from a platform at the root, where either of the inner or outer band can form the platform. A radial length 128R of the airfoil 120 is defined between the second root 126 and second tip 127. An axial length 128A of the airfoil 120 is defined between the second leading edge 122 and second trailing edge 123 as shown.

In addition, the tip 127 radially extends into the recess 105. A gap 106 can be defined between the tip 127 and the pocket surface 104. In the example shown, the second root 126 extends from the inner band 102 and the tip 127 extends into the recess 105 in the outer band 103.

An exemplary heated airflow 130 is illustrated moving through the assembly 100 past the vane 110 and airfoil 120. One exemplary force F is illustrated in the circumferential direction on the airfoil 120 due to the heated airflow 130. The curvatures of the pressure side 124 and suction side 125 (FIG. 2) causes a lower air pressure adjacent the suction side 125 as compared to the pressure side 124, generating the overall force F acting on the airfoil 120 as shown. Such a force F is also known as a "lifting" force on the airfoil. It will be understood that while not shown, the force F from the heated airflow 130 can also be applied to the vane 110 in a manner similar to that described for the airfoil 120.

It will be understood that the assembly 100 can be formed in a single piece having the monolithic body 101 with inner and outer bands 102, 103, pocket surface 104, vane 110, and airfoil 120. Any suitable manufacturing method or process can be utilized to form the assembly 100, including casting or additive manufacturing. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing, and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination.

In the example shown in FIG. 2, the assembly 100 includes a pair of airfoils 120 with a vane 110 spaced therebetween. A corresponding pair of pocket surfaces 104 and recesses 105 are provided in the outer band 103, and the tip 127 of each airfoil 120 extends into each recess 105 as shown. It is contemplated that multiple assemblies 100 can be coupled together circumferentially to form an annular structure about the engine centerline 12, such as a portion of the HP turbine stage 64 (FIG. 1). In an alternate example, the monolithic body of the assembly can include an entire annular structure about the centerline 12 having annular inner and outer bands with the vane 110 and airfoil 120.

In another example, it is contemplated that the pocket surface and recess can be located in the inner band. In such a case, the root can extend radially from the outer band, and the tip can extend into the recess located in the inner band. In yet another example (not shown), pocket surfaces and recesses can be provided on both the inner and outer bands. In such a case, one non-limiting implementation can include alternating airfoils wherein along a circumferential direction, a vane extends fully between the inner and outer bands, an airfoil has a root extending from the outer band and a tip extending into a recess in the inner band, a third airfoil extends fully between the inner and outer bands, and a fourth airfoil has a root extending from the inner band and a tip extending into a recess in the outer band.

In still another example, the monolithic body can include multiple airfoils each extending from a root at one of the inner or outer band to a tip extending into a recess in the other of the inner or outer band, with no additional vanes included in the assembly. In this example, every airfoil in the monolithic body includes a tip extending into a corresponding recess. The recesses can be formed on the inner band only, on the outer band only, or on both the inner and outer bands.

Turning to FIG. 3, a sectional view of the assembly 100 is shown proximate the recess 105. In the example shown, the pocket surface 104 forms a generally U-shaped recess 105 with a U-shaped gap 106 from the tip 127 of the airfoil 120. The gap 106 can define a gap distance 107 between any portion of the pocket surface 104 and the tip 127. One exemplary gap distance 107 is illustrated for clarity at the radially outermost portion of the tip 127. In one example, the gap distance 107 can be 0.5-0.8 mm. In addition, it is contemplated that the gap distance 107 can vary along differing portions of the gap 106. In the example shown, a first gap distance 107A is defined between the tip 127 and pocket surface 104 adjacent the pressure side 124, and a second gap distance 107B is defined between the tip 127 and pocket surface 104 adjacent the suction side 125. The second gap distance 107B can be greater than, smaller than, or equal to the first gap distance 107A.

Optionally, a support structure 140 can be included in the assembly 100. The support structure 140 can at least partially close the gap 106, including fully closing the gap 106. The support structure 140 can be coupled to at least one of the tip 127 or the pocket surface 104. For example, the support structure 140 can contact either the pressure side 124 or the suction side 125 of the airfoil 120. Furthermore, the support structure 140 can extend along at least a portion of the axial length 128A (FIG. 2), including the entire axial length 128A, of the airfoil 120.

During operation, the heated airflow 130 and rising environmental temperatures can cause thermal expansion of the airfoil 120 from its unheated or baseline state. Accordingly, either or both of the radial length 128R or axial length 128A (FIG. 2) can increase, and the gap distance 107 can decrease. In addition, vibrations or other forces can cause motion of the tip 127 within the recess 105. The force F can also push the tip 127 toward one side of the recess 105, causing the tip 127 to form a smaller gap distance 107B compared to the first gap distance 107B during operation of the engine 10. It can be appreciated that allowing for movement freedom of the tip 127 within the recess 105 can provide for reduced stresses within the airfoil 120 during operation, as compared to retaining both ends of a traditional static vane between inner and outer bands. In an example where the support structure 140 is included in the assembly 100, such a support structure 140 can provide for controlled or partially-restrained movement of the tip 127 while still allowing movement freedom during operation.

Referring now to FIG. 4, a sectional view is illustrated of another assembly 200 that can be utilized in the turbine engine 10 of FIG. 1. The assembly 200 is similar to the assembly 100. Therefore, like parts will be described with like numerals increased by 100, with it being understood that the description of the like parts of the assembly 100 applies to the assembly 200, unless otherwise noted.

The assembly 200 includes a body 201 with an inner band (not shown) similar to the inner band 102, an outer band 203, a vane (not shown) similar to the vane 110, and an airfoil 220 similar to the airfoil 120 and having a pressure side 224, a suction side 225, a first end (not shown) similar to the root 126, and a second end in the form of a tip 227. It is contemplated that the body 201 can be in the form of a monolithic body 201 as described above. The outer band 203 includes a pocket surface 204 defining a recess 205, and a gap 206 is defined between the tip 227 and the pocket surface 204. During operation of the engine 10 (FIG. 1), an overall force F acts on the airfoil 220 due to airflows through the assembly 200 as described above.

A support structure 240 is included in the assembly 200. In the illustrated example, the support structure 240 includes an airfoil recess 242 in the tip 227, a band aperture 244 in the outer band 203, and a pin 246 extending into or through the band aperture 244 and received in the airfoil recess 242. In one example, the airfoil recess 242 and band aperture 244 can be formed during the same manufacturing process as the monolithic body 201. In another example, the airfoil recess 242 and band aperture 244 can be formed by drilling, such as drilling a precise hole through the outer band 203 and into the tip 227. In such a case, the pin 246 can be inserted into the band aperture 244. In one example, the pin 246 can be retained within the band aperture 244 by an interference fit, wherein the band aperture 244 is slightly smaller than the diameter of the pin 246 such that the pin 246 is forced under pressure into the aperture 244. Additionally or alternatively, the pin 246 can be secured by spot-welding, adhesives, a secondary locking pin (not shown) extending perpendicularly through the pin 246, or the like, or any combination thereof. The pin 246 can also at least partially close the gap 206. In the example of FIG. 4, the pin 246 fully closes the gap 206 in the axial position of the pin 246. In the example shown, air cannot flow through recess 205 fully around the tip 227 in the plane of the section view, however such flow is possible upstream or downstream of pin 246. Optionally, a radial space 248 can be defined between the pin 246 and the airfoil 220 such that the airfoil 220 is free to expand radially, such as by thermal expansion.

It is also contemplated that in an example where drilling is utilized to form the airfoil recess 242 or band aperture 244, the monolithic body 201 can include a retaining ligament (not shown) to temporarily hold or support the tip 227 during the drilling process. Additionally or alternatively, the gap 206 can be filled with a sacrificial or temporary material (such as hard wax) for support. Such a retaining ligament can be formed in position with the airfoil 220 and outer band 203 and later removed, and any sacrificial or temporary supporting material can be later removed, such as by melting or dissolving.

In addition, the airfoil recess 242, band aperture 244, and pin 246 are illustrated with essentially rectangular geometric profiles, such as to accommodate a cylindrical pin 246. In another example (not shown), a diameter of the pin or band aperture can vary in the radial direction R. For example, the pin can have a narrower diameter adjacent the tip of the airfoil and a wider diameter within the outer band. Such a pin could be utilized having a conical or frusto-conical geometric profile, for instance. Any geometric profile is contemplated for use with the airfoil recess 242, band aperture 244, and pin 246.

During operation of the engine 10, the force F can push the tip 227 circumferentially against the pin 246 via the airfoil recess 242, which can further act to retain the pin 246. The airfoil 220 can still be provided with radial or circumferential movement freedom as shown, and the pin 246 can provide for a degree of fluid sealing in the gap 206 between the pressure side 224 and suction side 225.

Figure 5:
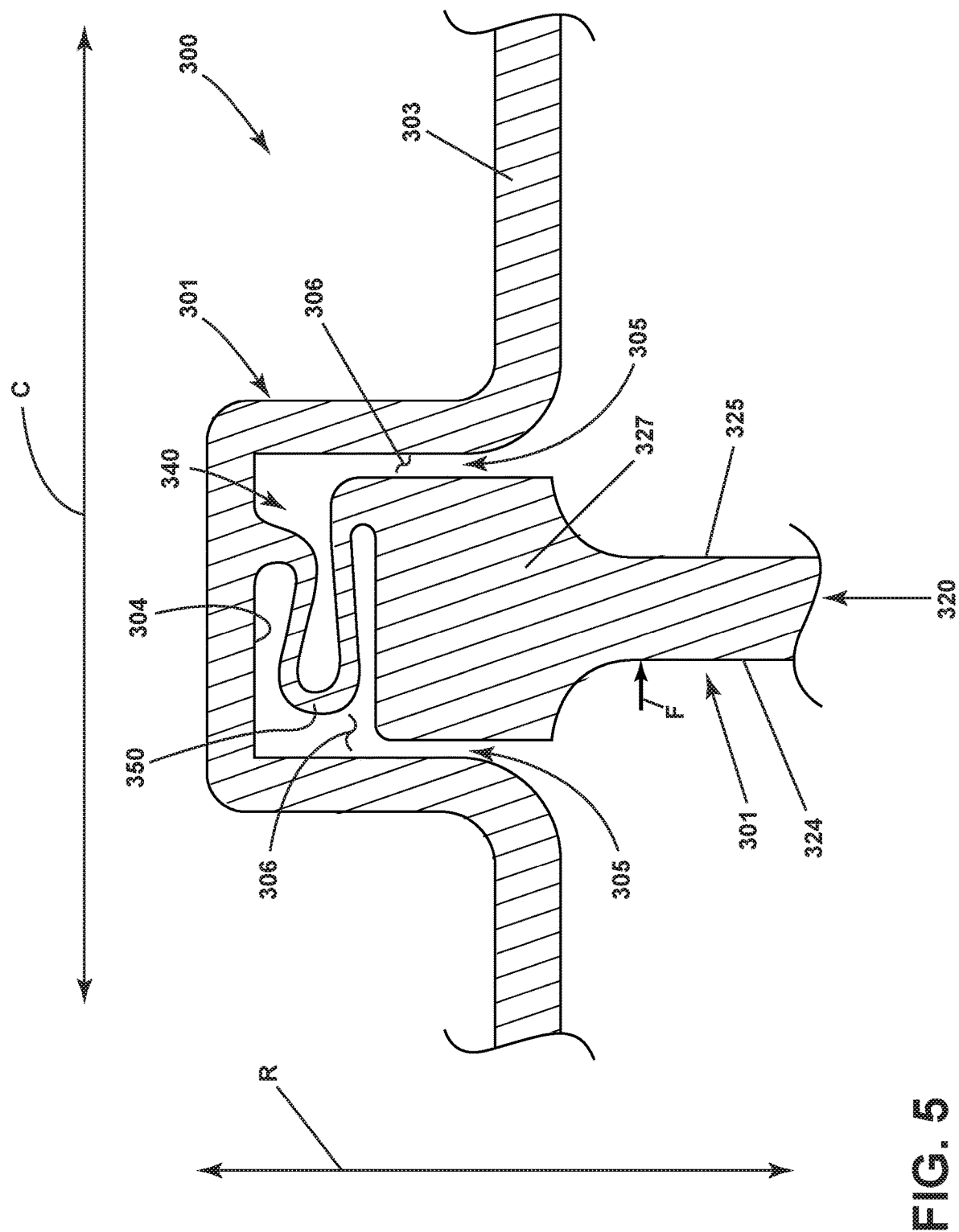
FIG. 5 is a side sectional view of another assembly that can be utilized in the turbine engine of FIG. 1 having another support structure in accordance with various aspects described herein.

Referring now to FIG. 5, a sectional view is illustrated of another assembly 300 that can be utilized in the turbine engine 10 of FIG. 1. The assembly 300 is similar to the assembly 100, 200. Therefore, like parts will be described with like numerals further increased by 100, with it being understood that the description of the like parts of the assembly 100, 200 applies to the assembly 300, unless otherwise noted.

The assembly 300 includes a body 301 with an inner band (not shown) similar to the inner band 102, an outer band 303, a vane (not shown) similar to the vane 110, and an airfoil 320 having a pressure side 324, a suction side 325, a first end (not shown) similar to the root 126, and a second end in the form of a tip 327. It is contemplated that the body 301 can be in the form of a monolithic body 301 as described above. The outer band 303 includes a pocket surface 304 defining a recess 305, and a gap 306 is defined between the tip 327 and the pocket surface 304. During operation of the engine 10 (FIG. 1), an overall force F acts on the airfoil 320 due to airflows through the assembly 300 as described above.

A support structure 340 is included in the assembly 300. One difference compared to the assemblies 100, 200 is that the support structure 340 is in the form of a damper 350 connecting the tip 327 and the pocket surface 304. The damper 350 can have a curvilinear geometric profile such that the damper 350 forms a spring-like or elastic structure. In such a case, during operation of the engine 10 (FIG. 1), circumferential or radial motion of the tip 327 can be damped while still providing for thermal expansion of the airfoil 320. In addition, the damper 350 can fully close the gap 306 such that air cannot flow through the recess between the pressure side 324 and suction side 325. Optionally, the damper 350 can be formed with perforations or other apertures (not shown), such as for weight reduction while still providing for effective sealing.

It is further contemplated that the damper 350 can extend axially along the tip 327 and pocket surface 304. In one example, the damper 350 can extend along an entire axial length of the airfoil 320 as described above with respect to FIG. 2. In another example, multiple axially-spaced dampers 350 can be provided between the airfoil 320 and the pocket surface 304.

Turning to FIG. 6, a sectional view is illustrated of another assembly 400 that can be utilized in the turbine engine 10 of FIG. 1. The assembly 400 is similar to the assembly 100, 200, 300. Therefore, like parts will be described with like numerals further increased by 100, with it being understood that the description of the like parts of the assembly 100, 200, 300 applies to the assembly 400, unless otherwise noted.

The assembly 400 includes a body 401 with an inner band (not shown) similar to the inner band 102, an outer band 403, a vane (not shown) similar to the vane 110, and an airfoil 420 having a pressure side 424, a suction side 425, a first end (not shown) similar to the root 126, and a second end in the form of a tip 427. It is contemplated that the body 401 can be in the form of a monolithic body 401 as described above. The outer band 403 includes a pocket surface 404 defining a recess 405, and a gap 406 is defined between the tip 427 and the pocket surface 404. During operation of the engine 10 (FIG. 1), an overall force F acts on the airfoil 420 as described above.

A support structure 440 is included in the assembly 400. One difference compared to the assembly 100, 200, 300 is that the support structure 440 is in the form of a clip 452 having a first clip end 454 and a second clip end 456. The clip 452 can be formed of any suitable material including, but not limited to, metals, polymers, or composite materials.

It is further contemplated that the clip 452 can extend axially along the tip 427 and pocket surface 404. In one example, the clip 452 can extend along an entire axial length of the airfoil 420 as described above with respect to FIG. 2. In another example, multiple axially-spaced clips 452 can be provided between the airfoil 420 and the pocket surface 404.

The airfoil 420 includes an airfoil recess 442 that forms a lip 443 on the suction side 425. The clip 452 has a curvilinear geometric profile forming a spring clip 452, wherein the first clip end 454 is retained by the tip 427 and the second clip end 456 is retained by the outer band 403. More specifically, the first clip end 454 can be retained by the lip 443, and the second clip end 456 can be retained by a bracket 458 coupled to the outer band 403. In one example, the bracket 458 can be included in the outer band 403 as part of the monolithic body 401.

When assembled, the clip 452 can circumferentially expand into place and span the gap 406 as shown, such that air cannot flow through the recess between the pressure side 424 and suction side 425. Optionally, the clip 452 can be formed with perforations or other apertures (not shown), such as for weight reduction while still providing for effective sealing. During operation of the engine 10 (FIG. 1), circumferential or radial motion of the tip 427 can be damped by the spring clip 452 while still providing for thermal expansion of the airfoil 420.

FIG. 7 illustrates a sectional view of another assembly 500 that can be utilized in the turbine engine 10 of FIG. 1. The assembly 500 is similar to the assembly 100, 200, 300, 400. Therefore, like parts will be described with like numerals further increased by 100, with it being understood that the description of the like parts of the assembly 100, 200, 300, 400 applies to the assembly 500, unless otherwise noted.

The assembly 500 includes a body 501 with an inner band (not shown) similar to the inner band 102, an outer band 503, a vane (not shown) similar to the vane 110, and an airfoil 520 having a pressure side 524, a suction side 525, a first end (not shown) similar to the root 126, and a second end in the form of a tip 527. It is contemplated that the body 501 can be in the form of a monolithic body 501 as described above. The outer band 503 includes a pocket surface 504 defining a recess 505, and a gap 506 is defined between the tip 527 and the pocket surface 504. During operation of the engine 10 (FIG. 1), an overall force F acts on the airfoil 520 as described above.

A support structure 540 is included in the assembly 500. The support structure 540 is in the form of a clip 552 having a first clip end 554 and a second clip end 556. The clip 552 can be formed of any suitable material including, but not limited to, metals, polymers, or composite materials.

The clip 552 can also extend axially along the tip 527 and pocket surface 504. In one example, the clip 552 can extend along an entire axial length of the airfoil 520 as described above with respect to FIG. 2. In another example, multiple axially-spaced clips 552 can be provided between the airfoil 520 and the pocket surface 504.

One difference compared to the assembly 100, 200, 300, 400 is that the outer band 503 includes a band aperture 544 through which the clip 552 can extend. In the example shown, the first clip end 554 has a curvilinear profile and is retained between the tip 527 and the pocket surface 504. The clip 552 extends fully through the outer band 503 via the band aperture 544, and the second clip end 556 is coupled to the outer band 503. For example, the clip 552 can be inserted through the band aperture 544 and retained via the first clip end 554, and a coupling point 560 can be used to secure the second clip end 556 to the outer band 503, such as by a spot weld, brazing, adhesive, locking pin, or other attachment mechanism.

When assembled, the clip 552 can span the gap 506 such that air cannot flow through the recess between the pressure side 524 and suction side 525. During operation of the engine 10 (FIG. 1), circumferential or radial motion of the tip 527 can be controlled by the clip 552 while still providing for thermal expansion of the airfoil 420.

Figure 8:
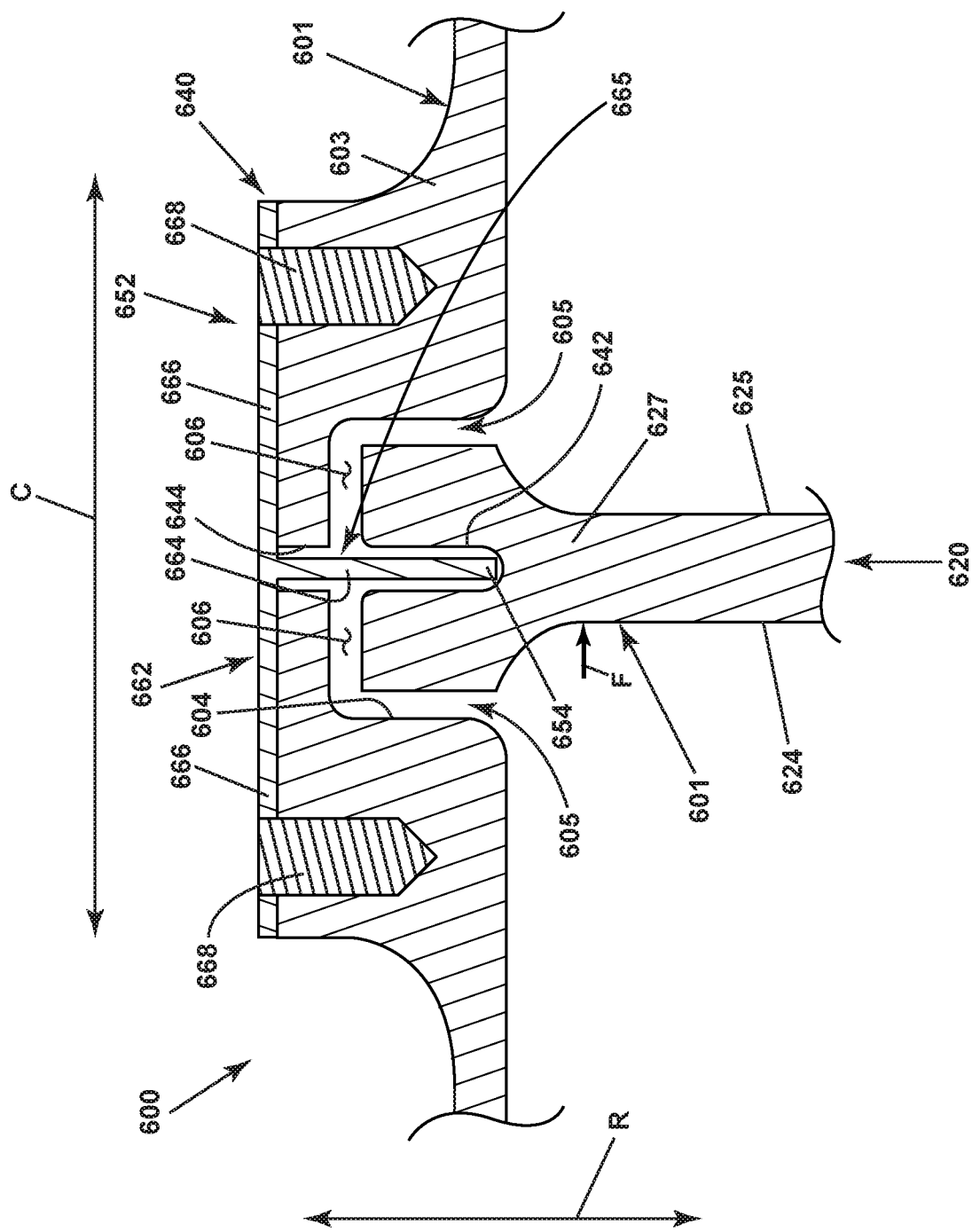
FIG. 8 is a side sectional view of another assembly that can be utilized in the turbine engine of FIG. 1 having another support structure in accordance with various aspects described herein.

FIG. 8 illustrates a sectional view of another assembly 600 that can be utilized in the turbine engine 10 of FIG. 1. The assembly 600 is similar to the assembly 100, 200, 300, 400, 500. Therefore, like parts will be described with like numerals further increased by 100, with it being understood that the description of the like parts of the assembly 100, 200, 300, 400, 500 applies to the assembly 600, unless otherwise noted.

The assembly 600 includes a body 601 with an inner band (not shown) similar to the inner band 102, an outer band 603, a vane (not shown) similar to the vane 110, and an airfoil 620 having a pressure side 624, a suction side 625, a first end (not shown) similar to the root 126, and a second end in the form of a tip 627. It is contemplated that the body 601 can be in the form of a monolithic body 601 as described above. The outer band 603 includes a pocket surface 604 defining a recess 605, and a gap 606 is defined between the tip 627 and the pocket surface 604. During operation of the engine 10 (FIG. 1), an overall force F acts on the airfoil 620 as described above.

A support structure 640 is included in the assembly 600. The support structure 640 is in the form of a clip 652. One difference compared to the assembly 100, 200, 300, 400, 500 is that the clip 652 includes a T-shaped body 662 with a first leg 664 terminating in a first clip end 654. The first leg 664 extends through a band aperture 644 in the outer band 403, spans the gap 606, and extends into the tip 627 via an airfoil recess 642. In addition, the T-shaped body 662 includes a second leg 666 extending perpendicular to the first leg 664. The second leg 666 can coupled to the outer band 603. In the example shown, fastening pins 668 are utilized to secure the second leg 666. In other examples (not shown), the second leg 666 can be welded, brazed, secured with adhesives, or secured with other hardware such as bolts, screws, locking pins, or the like. The clip 652 can also provide for radial or circumferential movement of the airfoil 620 during operation of the engine 10 (FIG. 1) as described above.

When assembled, the support structure 640 can form a labyrinth seal 665 at least partially defined by the gap 606 and the first leg 664. As is commonly understood with labyrinth seals, a small amount of air may be able to flow around a labyrinthine path defined by the labyrinth seal 665 while the bulk of the air is prevented from flowing through the seal 665. For example, a small amount of air can flow from the pressure side 624, into the recess 605, into the airfoil recess 642, around the first leg 664 and first clip end 652, and out of the recess 605 at the suction side 625.

Figure 9:
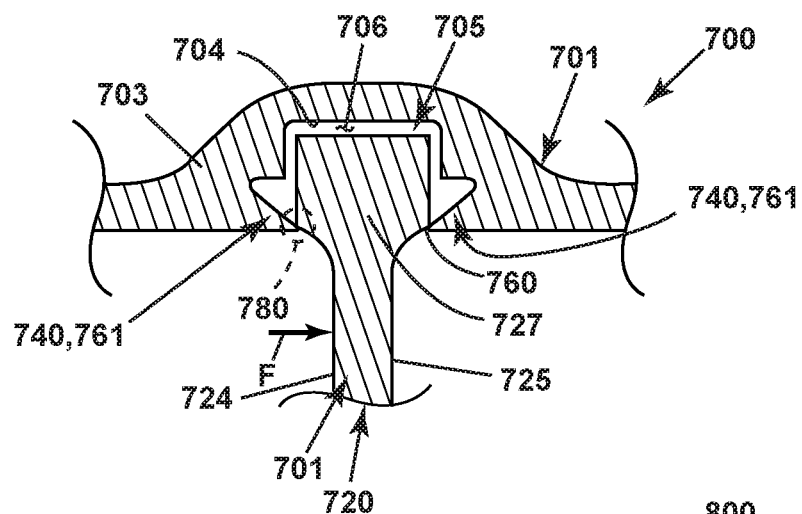
FIG. 9 is a side sectional view of another assembly that can be utilized in the turbine engine of FIG. 1 having another support structure in accordance with various aspects described herein.

FIG. 9 illustrates a sectional view of another assembly 700 that can be utilized in the turbine engine 10 of FIG. 1. The assembly 700 is similar to the assembly 100, 200, 300, 400, 500, 600. Therefore, like parts will be described with like numerals further increased by 100, with it being understood that the description of the like parts of the assembly 100, 200, 300, 400, 500, 600 applies to the assembly 700, unless otherwise noted.

The assembly 700 includes a body 701 with an inner band (not shown) similar to the inner band 102, an outer band 703, a vane (not shown) similar to the vane 110, and an airfoil 720 having a pressure side 724, a suction side 725, a first end (not shown) similar to the root 126, and a second end in the form of a tip 727. It is contemplated that the body 701 can be in the form of a monolithic body 701 as described above. The outer band 703 includes a pocket surface 704 defining a recess 705, and a gap 706 is defined between the tip 727 and the pocket surface 704. During operation of the engine 10 (FIG. 1), an overall force F acts on the airfoil 720 as described above.

A support structure 740 is included in the assembly 700. The support structure 740 can be coupled by at least one coupling point 760. The support structure 740 can also extend axially along the tip 727 and pocket surface 704. In one example, the support structure 740 can extend along an entire axial length of the airfoil 720 as described above with respect to FIG. 2. In another example, multiple axially-spaced support structures 740 can be provided between the airfoil 720 and the pocket surface 704.

One difference compared to the assembly 100, 200, 300, 400, 500, 600 is that the support structure 740 is configured to break away at the at least one coupling point 760 during operation of the engine 10 (FIG. 1) or due to purposeful manipulation prior to assembly. In the example of FIG. 9, two coupling points 760 are provided between the outer band 703 and tip 727. The coupling points 760 can be in the form of ligaments or protrusions 761 formed with the monolithic body 701 that are formed along with the outer band 703 and airfoil 720. During operation, the coupling points 760 can break away from the tip 727 to define a narrowed gap 780. Such breaking away can occur due to thermal expansion of the airfoil 720, radial or circumferential movement of the tip 727, or due to an applied load (not shown), in non-limiting examples.

The narrowed gap 780 can be smaller or narrower than the gap 706. In one example where the monolithic body 701 is formed by additive manufacturing, it is contemplated that the gap 706 can be 500 micrometers between the pocket surface 704 and second end 727. In such a case, the narrowed gap 780 can be smaller than 500 micrometers, including 5-50 micrometers in a non-limiting example. It is contemplated that the narrowed gap 780 formed by a broken-away coupling point 760 can be smaller than that currently achievable by additive manufacturing or other forming processes. In addition, such a narrowed gap 780 can provide for sealing of the gap 706 wherein only a very small amount of air can flow through the recess 705 from the pressure side 724 to the suction side 725.

Figure 10:
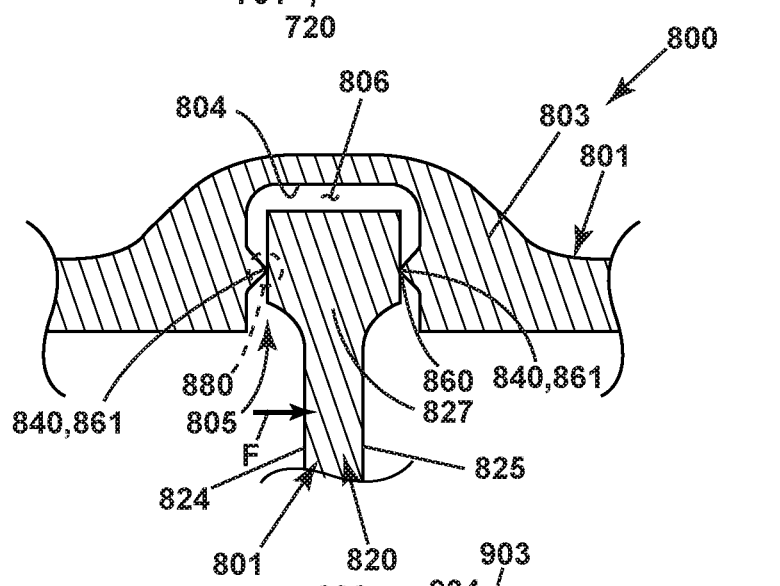
FIG. 10 is a side sectional view of another assembly that can be utilized in the turbine engine of FIG. 1 having another support structure in accordance with various aspects described herein.

FIG. 10 illustrates a sectional view of another assembly 800 that can be utilized in the turbine engine 10 of FIG. 1. The assembly 800 is similar to the assembly 100, 200, 300, 400, 500, 600, 700. Therefore, like parts will be described with like numerals further increased by 100, with it being understood that the description of the like parts of the assembly 100, 200, 300, 400, 500, 600, 700 applies to the assembly 800, unless otherwise noted.

The assembly 800 includes a body 801 with an inner band (not shown) similar to the inner band 102, an outer band 803, a vane (not shown) similar to the vane 110, and an airfoil 820 having a pressure side 824, a suction side 825, a first end (not shown) similar to the root 126, and a second end in the form of a tip 827. It is contemplated that the body 801 can be in the form of a monolithic body 801 as described above. The outer band 803 includes a pocket surface 804 defining a recess 805, and a gap 806 is defined between the tip 827 and the pocket surface 804. During operation of the engine 10 (FIG. 1), an overall force F acts on the airfoil 820 as described above.

A support structure 840 is included in the assembly 800. The support structure 840 can be coupled by at least one coupling point 860 configured to break away during operation of the engine 10 (FIG. 1).

In the example of FIG. 10, two coupling points 860 are provided between the outer band 803 and tip 827. The coupling points 860 can be in the form of ligaments or protrusions 861 defined by the pocket surface 804. One difference compared to the assembly 100, 200, 300, 400, 500, 600, 700 is that the protrusions 861 are located radially outward from the opening to the recess 805 as shown. During operation, the coupling points 860 can break away from the tip 827 to define a narrowed gap 880 that can be smaller or narrower than the gap 806 as described above.

Figure 11:
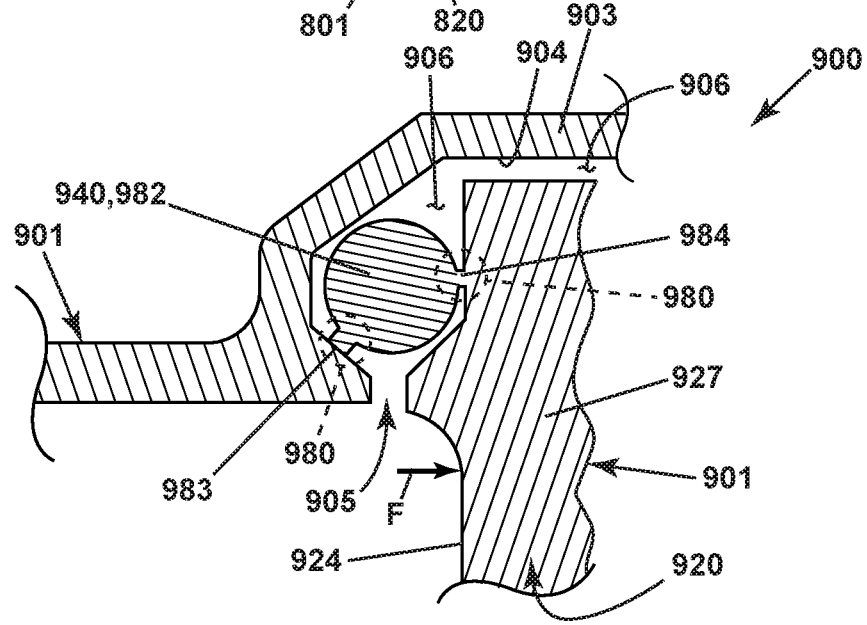
FIG. 11 is a side sectional view of another assembly that can be utilized in the turbine engine of FIG. 1 having another support structure in accordance with various aspects described herein.

FIG. 11 illustrates a sectional view of another assembly 900 that can be utilized in the turbine engine 10 of FIG. 1. The assembly 900 is similar to the assembly 100, 200, 300, 400, 500, 600, 700, 800. Therefore, like parts will be described with like numerals further increased by 100, with it being understood that the description of the like parts of the assembly 100, 200, 300, 400, 500, 600, 700, 800 applies to the assembly 900, unless otherwise noted.

The assembly 900 includes a body 901 with an inner band (not shown) similar to the inner band 102, an outer band 903, a vane (not shown) similar to the vane 110, and an airfoil 920 having a pressure side 924, a suction side (not shown) similar to the suction side 125, 225, 325, 425, 525, 625, 725, 825, a first end (not shown) similar to the root 126, and a second end in the form of a tip 927. It is contemplated that the body 901 can be in the form of a monolithic body 901 as described above. The outer band 903 includes a pocket surface 904 defining a recess 905, and a gap 906 is defined between the tip 927 and the pocket surface 904. During operation of the engine 10 (FIG. 1), an overall force F acts on the airfoil 920 as described above.

A support structure 940 is included in the assembly 900. The support structure 940 can be coupled by at least one coupling point configured to break away during operation of the engine 10 (FIG. 1). One difference compared to the assembly 100, 200, 300, 400, 500, 600, 700, 800 is that the support structure 940 includes a central body 982 with a first coupling point 983 at the outer band 903 and a second coupling point 984 at the tip 927. While the central body 982 is illustrated as having a circular profile, e.g. a spherical or cylindrical central body 982, any geometric profile is contemplated for use for the support structure 940. During operation, the coupling points 983, 984 can break away from the respective outer band 903 and tip 827 to define corresponding narrowed gaps 980 that can be smaller or narrower than the gap 906 as described above. More specifically, the central body 982 can be carried by the air flow from the pressure side 924 over the tip 927 toward the suction side 925. The central body 982 can be wedged into the gap 906 due to the air flow to seal the gap 906. The wedge surfaces of outer band surface 904 and the airfoil tip 927 can be arranged as shown in FIG. 11, but are not limited to the configuration or geometric profile shown. Surfaces around the recess 905 may form any wedge configuration with central body 982 that will seal the flow or dampen movement of the airfoil 920 while enabling thermal expansion.

Figure 12:
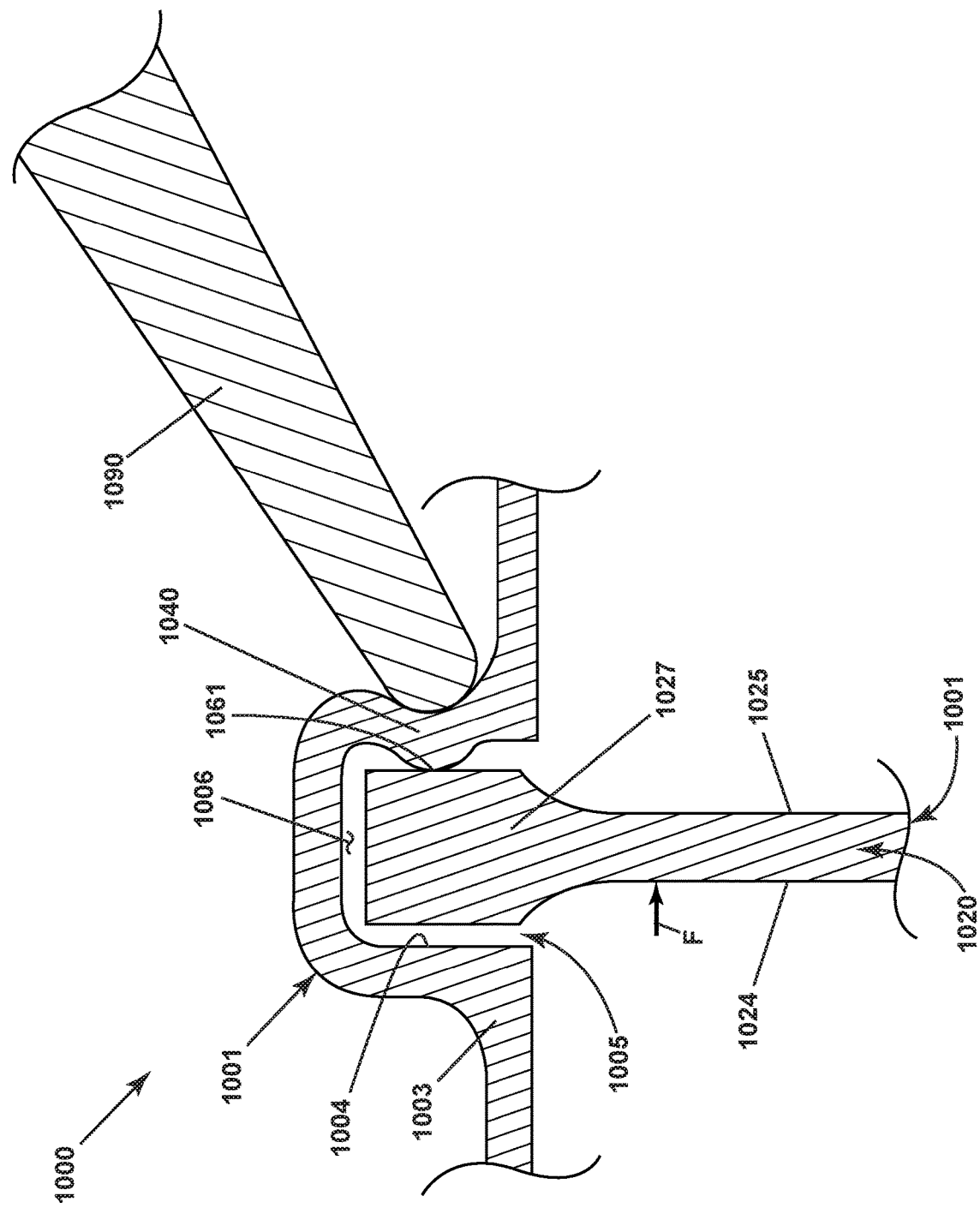
FIG. 12 is a side sectional view of another assembly that can be utilized in the turbine engine of FIG. 1 having another support structure in accordance with various aspects described herein.

Turning to FIG. 12, a sectional view is illustrated of another assembly 1000 that can be utilized in the turbine engine 10 of FIG. 1. The assembly 1000 is similar to the assembly 100, 200, 300, 400, 500, 600, 700, 800, 900. Therefore, like parts will be described with like numerals further increased by 100, with it being understood that the description of the like parts of the assembly 100, 200, 300, 400, 500, 600, 700, 800, 900 applies to the assembly 1000, unless otherwise noted.

The assembly 1000 includes a body 1001 with an inner band (not shown) similar to the inner band 102, an outer band 1003, a vane (not shown) similar to the vane 110, and an airfoil 1020 having a pressure side 1024, a suction side 1025, a first end (not shown) similar to the root 126, and a second end in the form of a tip 1027. It is contemplated that the body 1001 can be in the form of a monolithic body 1001 as described above. The outer band 1003 includes a pocket surface 1004 defining a recess 1005, and a gap 1006 is defined between the tip 1027 and the pocket surface 1004. During operation of the engine 10 (FIG. 1), an overall force F acts on the airfoil 1020 as described above.

A support structure 1040 is included in the assembly 1000. The support structure 1040 is in the form of a protrusion 1061 defined by the pocket surface 1004 and contacting the second end 1027 of the airfoil 1020. One difference compared to the assembly 100, 200, 300, 400, 500, 600, 700, 800, 900 is that the protrusion 1061 can be formed via deformation of the monolithic body 1001, such as with a tool 1090. In one example, the tool 1090 can be in the form of a rounded punch that causes plastic deformation of the outer band 1003 and forms the protrusion 1061 contacting the second end 1027. The tool 1090 can include any style of punch, press, or the like to form the protrusion 1061.

The protrusion 1061 can also extend axially along the tip 1027 and pocket surface 1004. For example, the protrusion 1061 can extend along an entire axial length of the airfoil 1020 as described above with respect to FIG. 2. In another example, multiple axially-spaced protrusions 1061 can be formed in the pocket surface 1004. While illustrated along the suction side 1025, protrusions 1061 can be formed anywhere along the recess 1005, including along the pressure side 1024 or radially outward of the tip 1027. During operation of the engine 10 (FIG. 1), the protrusion 1061 can provide for sealing of the gap 1006 as well as controlled circumferential or radial movement of the tip 1027 as described above.

It will be understood that above-described aspects of the assemblies 100, 200, 300, 400, 500, 600, 700, 800, 900, 1000 can be combined or substituted with one another to form a variety of additional aspects. Some non-limiting examples will be described below, and other examples of combinations or substitutions not explicitly described are nonetheless covered by this disclosure.

In one example, an assembly can include a curvilinear damper in addition to break-away coupling points between the airfoil and the pocket surface. In such a case, the curvilinear damper can provide for controlled movement of the second end after experiencing sufficient force to cause the coupling points to break away.

In another example, an assembly can include a pin similar to that of FIG. 4 with the addition of a protrusion in the pocket surface proximate the suction side, similar to that described in FIG. 12. In such a case, the protrusion can provide for additional sealing at the suction side while the pin, band aperture, and airfoil recess still provide for at least radial movement of the second end during operation.

In still another example, the clips of FIGS. 6 and 7 can be utilized for the same airfoil second end. In such a case, the clip of FIG. 7 can be utilized at one side, e.g. the pressure side, while the spring clip of FIG. 6 is utilized at the opposite side, e.g. the suction side, to provide for controlled movement of the second end during operation.

The above described aspects provide for a variety of benefits. It can be appreciated that the use of a recess containing support structures or other features can provide for sealing or damping functionality for the airfoil. The recess in the inner or outer band can allow for at least one degree of movement freedom for the airfoil within the recess, which can reduce operational stresses on the airfoil and increase part lifetimes. The variety of support structures described herein can provide for sealing of the recess, preventing undesirable ingestion of hot gases into the recess, as well as providing for multiple methods of controlling or damping any excessive motion of the airfoil within the recess. Elastic or spring-like support structures can provide for damping of airfoil motion while still providing movement freedom. Break-away support structures can provide for near-total sealing with gaps smaller than current manufacturing methods can produce, while still allowing for movement freedom of the airfoil in the recess. Clips inserted through apertures can utilize known, easily obtained, or mass-produced hardware which is easy to install while still providing for sealing of the gap and controlling movement freedom of the airfoil. The use of additively-manufactured or printed internal features such as the curvilinear damper can provide for in-situ "assembly" with the monolithic body without need of additional installation steps to provide the support structure, which can improve process efficiencies.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An assembly for a turbine engine comprising:
a monolithic body, comprising:
an inner band and an outer band radially spaced from the inner band;
a pocket surface in one of the inner or outer bands defining a recess; and
an airfoil comprising an outer wall defining a pressure side and a suction side, a first end radially extending from the other of the inner or outer bands, and a second end radially extending into the recess to define a gap between the airfoil and the one of the inner or outer bands.

2. The assembly of any preceding clause, further comprising a support structure at least partially closing the gap and coupled to at least one of the second end or the pocket surface.

3. The assembly of any preceding clause wherein the support structure comprises:
an airfoil recess in the second end; and
a pin extending into the one of the inner or outer bands and received in the airfoil recess to at least partially close the gap.

4. The assembly of any preceding clause wherein the support structure comprises a clip spanning the gap and having a first clip end retained by the second end of the airfoil.

5. The assembly of any preceding clause wherein the clip further comprises a spring clip having a second clip end retained by the one of the inner or outer bands.

6. The assembly of any preceding clause wherein the second end extends fully through the one of the inner or outer bands.

7. The assembly of any preceding clause wherein the clip further comprises a T-shaped body with a first leg terminating in the first clip end and extending into the second end of the airfoil.

8. The assembly of any preceding clause wherein the T-shaped body comprises a second leg extending perpendicular to the first leg and coupled to the one of the inner or outer bands.

9. The assembly of any preceding clause, further comprising a labyrinth seal at least partially defined by the gap and the first leg of the T-shaped body.

10. The assembly of any preceding clause wherein the support structure comprises at least one curvilinear damper connecting the second end of the airfoil and the one of the inner or outer bands.

11. The assembly of any preceding clause wherein the support structure extends along an entire axial length of the airfoil.

12. The assembly of any preceding clause wherein the support structure is coupled by at least one coupling point to the at least one of the second end or the pocket surface.

13. The assembly of any preceding clause wherein the support structure is configured to break away at the at least one coupling point to define a narrowed gap, smaller than the gap, between the second end and the pocket surface.

14. The assembly of any preceding clause wherein the support structure comprises a protrusion defined by the pocket surface and contacting the second end of the airfoil.

15. The assembly of any preceding clause wherein the support structure contacts the suction side of the airfoil.

16. The assembly of any preceding clause wherein the support structure fully closes the gap.

17. The assembly of any preceding clause wherein the airfoil comprises a static vane in one of a compressor or a turbine section in the turbine engine.

18. The assembly of any preceding clause wherein the monolithic body further comprises a vane extending fully between the inner band and the outer band.

19. The assembly of any preceding clause wherein the monolithic body further comprises a pair of airfoils and a corresponding pair of recesses in the one of the inner or outer bands, the pair of airfoils having first ends radially extending from the other of the inner or outer bands and second ends radially extending into the pair of recesses, with the vane positioned circumferentially between each airfoil in the pair of airfoils.

20. A turbine engine, comprising:
  a compressor, a combustor, and a turbine in axial arrangement; and
  an assembly in at least one of the compressor or the turbine, the assembly having a monolithic body comprising:
    an inner band and an outer band radially spaced from the inner band;
    a pocket surface in one of the inner or outer bands defining a recess; and
    an airfoil comprising an outer wall defining a pressure side and a suction side, a first end radially extending from the other of the inner or outer bands, and a second end radially extending into the recess to define a gap between the airfoil and the one of the inner or outer bands.

21. The turbine engine of any preceding clause further comprising a support structure at least partially closing the gap, wherein the support structure comprises one of a pin, a clip, a curvilinear damper, or a protrusion.

22. An assembly for a turbine engine comprising a monolithic body having an inner band, an outer band radially spaced from the inner band, a first vane extending between and joining the inner and outer bands, a recess in one of the inner or outer bands, and a second vane having a root at the other of the inner or outer bands and a second tip located within the recess and free of the one of the inner or outer bands.

What is claimed is:

1. An assembly for a turbine engine comprising:
  a monolithic body, comprising:
    an inner band and an outer band radially spaced from the inner band;
    a pocket surface in one of the inner or outer bands defining a recess; and
    an airfoil comprising an outer wall defining a pressure side and a suction side, a first end radially extending from the other of the inner or outer bands, and a second end radially extending into the recess to define a gap between the airfoil and the one of the inner or outer bands.

2. The assembly of claim 1, further comprising a support structure at least partially closing the gap and coupled to at least one of the second end or the pocket surface.

3. The assembly of claim 2 wherein the support structure comprises:
  an airfoil recess in the second end; and
  a pin extending into the one of the inner or outer bands and received in the airfoil recess to at least partially close the gap.

4. The assembly of claim 2 wherein the support structure comprises a clip spanning the gap and having a first clip end retained by the second end of the airfoil.

5. The assembly of claim 4 wherein the clip further comprises a spring clip having a second clip end retained by the one of the inner or outer bands.

6. The assembly of claim 5 wherein the second end extends fully through the one of the inner or outer bands.

7. The assembly of claim 4 wherein the clip further comprises a T-shaped body with a first leg terminating in the first clip end and extending into the second end of the airfoil.

8. The assembly of claim 7 wherein the T-shaped body comprises a second leg extending perpendicular to the first leg and coupled to the one of the inner or outer bands.

9. The assembly of claim 8, further comprising a labyrinth seal at least partially defined by the gap and the first leg of the T-shaped body.

10. The assembly of claim 2 wherein the support structure comprises at least one curvilinear damper connecting the second end of the airfoil and the one of the inner or outer bands.

11. The assembly of claim 2 wherein the support structure extends along an entire axial length of the airfoil.

12. The assembly of claim 2 wherein the support structure is coupled by at least one coupling point to the at least one of the second end or the pocket surface.

13. The assembly of claim 12 wherein the support structure is configured to break away at the at least one coupling point to define a narrowed gap, smaller than the gap, between the second end and the pocket surface.

14. The assembly of claim 2 wherein the support structure comprises a protrusion defined by the pocket surface and contacting the second end of the airfoil.

15. The assembly of claim 2 wherein the support structure contacts the suction side of the airfoil.

16. The assembly of claim 2 wherein the support structure fully closes the gap.

17. The assembly of claim 1 wherein the airfoil comprises a static vane in one of a compressor or a turbine section in the turbine engine.

18. The assembly of claim 1 wherein the monolithic body further comprises a vane extending fully between the inner band and the outer band.

19. The assembly of claim 18 wherein the monolithic body further comprises a pair of airfoils and a corresponding pair of recesses in the one of the inner or outer bands, the pair of airfoils having first ends radially extending from the other of the inner or outer bands and second ends radially extending into the pair of recesses, with the vane positioned circumferentially between each airfoil in the pair of airfoils.

20. A turbine engine, comprising:
  a compressor, a combustor, and a turbine in axial arrangement; and
  an assembly in at least one of the compressor or the turbine, the assembly having a monolithic body comprising:
    an inner band and an outer band radially spaced from the inner band;
    a pocket surface in one of the inner or outer bands defining a recess; and
    an airfoil comprising an outer wall defining a pressure side and a suction side, a first end radially extending from the other of the inner or outer bands, and a second end radially extending into the recess to define a gap between the airfoil and the one of the inner or outer bands.

21. The turbine engine of claim 20, further comprising a support structure at least partially closing the gap, wherein the support structure comprises one of a pin, a clip, a curvilinear damper, or a protrusion.

22. An assembly for a turbine engine comprising a monolithic body having an inner band, an outer band radially spaced from the inner band, a recess in one of the inner or outer bands, and a vane having a root at the other of the inner or outer bands and a second tip located within the recess and free of the one of the inner or outer bands.

* * * * *